US012610109B2

(12) United States Patent
Stockman et al.

(10) Patent No.: US 12,610,109 B2
(45) Date of Patent: Apr. 21, 2026

(54) SYSTEMS AND METHODS FOR DYNAMIC INTERACTIVE USER CONTROL IN LIVE STREAMING WITH INTEGRATED ARTIFICIAL INTELLIGENCE

(71) Applicant: The Recording Academy, Santa Monica, CA (US)

(72) Inventors: Kaitlyn Stockman, Santa Monica, CA (US); Ray Starck, Santa Monica, CA (US)

(73) Assignee: THE RECORDING ACADEMY, Santa Monica, CA (US)

( * ) Notice: Subject to any disclaimer, the term of this patent is extended or adjusted under 35 U.S.C. 154(b) by 0 days.

(21) Appl. No.: 18/526,743

(22) Filed: Dec. 1, 2023

(65) Prior Publication Data

US 2025/0184573 A1 Jun. 5, 2025

Related U.S. Application Data

(60) Provisional application No. 63/587,031, filed on Sep. 29, 2023.

(51) Int. Cl.
H04N 21/478 (2011.01)
H04N 21/2187 (2011.01)

(52) U.S. Cl.
CPC ....... H04N 21/478 (2013.01); H04N 21/2187 (2013.01)

(58) Field of Classification Search
CPC ......................... H04N 21/478; H04N 21/2187
USPC ......................................................... 725/37
See application file for complete search history.

(56) References Cited

U.S. PATENT DOCUMENTS

| | | | | |
|---|---|---|---|---|
| 9,961,204 | B1 * | 5/2018 | Moran | G06Q 10/06393 |
| 9,973,819 | B1 * | 5/2018 | Taylor | G06Q 30/0643 |
| 10,021,458 | B1 * | 7/2018 | Taylor | H04N 21/2187 |
| 10,045,091 | B1 * | 8/2018 | Nijim | H04N 21/4725 |
| 10,320,728 | B2 * | 6/2019 | Patierno | H04L 51/10 |
| 10,440,436 | B1 * | 10/2019 | Taylor | H04N 21/812 |
| 10,621,231 | B2 * | 4/2020 | Marsh | G06F 16/7844 |
| 10,803,111 | B2 * | 10/2020 | Barlaskar | G06F 16/7328 |
| 10,924,790 | B1 * | 2/2021 | Reynolds | H04N 21/44218 |
| 11,330,346 | B1 * | 5/2022 | Duraiswamy | H04N 21/432 |
| 11,922,553 | B1 * | 3/2024 | Liu | H04N 21/6587 |
| 12,184,930 | B1 * | 12/2024 | Gratias | H04N 21/8456 |
| 2007/0299870 | A1 * | 12/2007 | Finch | H04N 21/472 |
| 2009/0307721 | A1 * | 12/2009 | Afram | H04N 21/4316 725/87 |
| 2015/0181301 | A1 * | 6/2015 | Bloch | H04N 21/4532 725/41 |
| 2018/0167692 | A1 * | 6/2018 | Kedenburg, III | H04N 21/482 |
| 2018/0357728 | A1 * | 12/2018 | Huening | H04L 67/535 |

(Continued)

*Primary Examiner* — Sahar Aqil Riaz
(74) *Attorney, Agent, or Firm* — Greenberg Traurig, LLP

(57) ABSTRACT

A computer-implemented method may include identifying a video stream for presentation to a user, extracting, from content of a segment of the video stream, at least one topic, presenting, to the user, the at least one topic as a selectable interface item in a graphical user interface when the segment of the video stream is presented to the user, receiving an input from the user selecting the at least one topic via the selectable interface item, and providing, in response to receiving the input from the user, the at least one topic as a prompt to a generative machine learning model. Various other methods, systems, and computer-readable media are also disclosed.

18 Claims, 8 Drawing Sheets

100

(56)     References Cited

U.S. PATENT DOCUMENTS

| | | | |
|---|---|---|---|
| 2019/0052934 A1* | 2/2019 | Groves | H04N 21/632 |
| 2019/0266254 A1* | 8/2019 | Blumenfeld | G06N 3/006 |
| 2020/0099987 A1* | 3/2020 | Petrillo | H04N 21/4884 |
| 2020/0413156 A1* | 12/2020 | Zeiler | H04N 21/4312 |
| 2021/0133692 A1* | 5/2021 | DeLuca | G06N 5/02 |
| 2021/0264804 A1* | 8/2021 | Venkatasubramanyam | |
| | | | G06N 5/04 |
| 2022/0293107 A1* | 9/2022 | Leaman | G06N 20/00 |
| 2022/0303621 A1* | 9/2022 | Ahn | H04N 21/2343 |
| 2023/0054663 A1* | 2/2023 | Wu | G06N 20/00 |
| 2023/0403440 A1* | 12/2023 | Shoss | H04N 21/8133 |
| 2024/0205038 A1* | 6/2024 | Dotan-Cohen | H04L 12/1831 |
| 2024/0281677 A1* | 8/2024 | Mifflin | G06N 5/04 |
| 2024/0291779 A1* | 8/2024 | Catalano | H04L 51/52 |
| 2025/0001296 A1* | 1/2025 | Fulks | G06F 40/253 |
| 2025/0005050 A1* | 1/2025 | Krishnan | G06F 16/243 |
| 2025/0055867 A1* | 2/2025 | Ahmed | G06F 16/2365 |

* cited by examiner

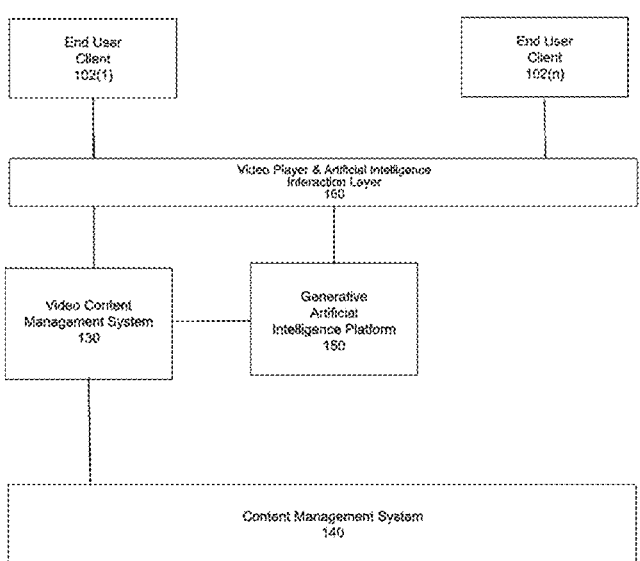
*FIG. 1*

200

300

```
┌─────────────────────────────────────────────────────────────────────────┐
│  ( stream_active )  ( stream_active )                               130   │
│                                           Video Content Management System │
└─────────────────────────────────────────────────────────────────────────┘

┌─────────────────────────────────────────────────────────────────────────┐
│                                                                     150   │
│                                  Generative Artificial Intelligence Platform │
└─────────────────────────────────────────────────────────────────────────┘
```

┌──────────────┐        ┌─────────────────────────┐
│     102      │──NO──▶ │           150           │
│ User clicks prompt │   │ Add to defined prompt_topic_1 │
│     230      │        │           270           │
└──────────────┘        └─────────────────────────┘
        │
       YES                ┌──────────────┐      ┌────────────────┐
        │                 │     150      │      │      150       │──NO──▶
        ▼                 │ Display current │    │ prompt_topic still │
┌──────────────┐          │ prompt_topic & │◀──  │ weighted as top │
│     150      │          │ arrange until updated │  │ #? 274      │
│ Display banner with │   │     272      │      └────────────────┘
│ click through action │  └──────────────┘            │
│ text & stream_active │        ⊕                   YES
│ title 232    │        ┌──────────────┐  ┌──────────────┐  ┌──────────────┐  ┌──────────────┐
└──────────────┘        │     150      │  │     150      │  │     150      │  │     150      │
        │               │ Display current │ │ Update prompt_slot │ │ Display most recent │ │ After defined duration, │
        ▼               │ prompt until defined │ │ with defined prompt_topic │ │ prompt added to │ │ update prompt_slot with │
┌──────────────┐        │ duration met 280 │ │     282      │◀─│ defined prompt_topic │◀─│ new prompt_topic 276 │
│     150      │        └──────────────┘  └──────────────┘  │     284      │  └──────────────┘
│ Display insight in │                                      └──────────────┘
│ artificial intelligence │
│ response window 234 │
└──────────────┘
        │
        ▼
┌──────────────┐
│     150      │
│ Add to prompt_topic_2 │
│     236      │
└──────────────┘                                                  YES
        │                ┌──────────────┐  ┌──────────────┐  ┌──────────────┐  ┌──────────────┐  ┌──────────────┐
        ▼                │     150      │  │     150      │  │     150      │  │     150      │  │     150      │
┌──────────────┐        │ Natural      │  │ Context related │ │ Add to prompt_topic_3 │ │ Display defined default │
│     001      │──YES──▶│ Language     │◀─│ to trained data? │──NO──▶│  286      │──▶│ response 288 │
│ User sends artificial │ │ Processing   │  │     282      │  └──────────────┘  └──────────────┘
│ intelligence a response │ │     260      │  └──────────────┘
│     238      │        └──────────────┘
└──────────────┘
        │
        NO
        ▼
┌──────────────┐
│     150      │
│ 3 second delay after AI │
│ insight is displayed 240 │
└──────────────┘
        │
        ▼
┌──────────────┐
│     150      │
│ Display Click Through │
│ Action button 242 │
└──────────────┘
        │
        ▼
┌──────────────┐        ┌──────────────┐  ┌──────────────┐
│     001      │──YES──▶│     150      │  │     150      │
│ User clicks the Click │ │ Identify source │ │ Display source │
│ Through Action button │ │ content links │─▶│ content links as │
│     244      │        │     256      │  │ clickable thumbnails │
└──────────────┘        └──────────────┘  │     252      │
        │                                 └──────────────┘
        NO                                        │
        ▼                                         ▼
┌──────────────┐                          ┌──────────────┐
│     150      │◀────NO──────────────────│     001      │
│ Maintain insight in │                   │ User clicks thumbnail │
│ artificial intelligence │                │     254      │
│ response window 246 │                   └──────────────┘
└──────────────┘                                  │
        │                                        YES
        ▼                                         ▼
┌──────────────┐                          ┌──────────────┐
│     150      │                          │     001      │
│ Update prompt_slot │                    │ link opens in external │
│ with new prompt_topic │                 │ window 258   │
│     248      │                          └──────────────┘
└──────────────┘

LIVE STREAM OF 29$^{th}$ ANNUAL AWARDS SHOW

402

LIVE PERFORMANCE BY MIDNIGHT MARINER

Chat with AI

User    (Enter your question here or select a prompt from the live list to get started!)

504    Why has singer Natalie Reed left the stage?

404    When did Midnight Mariner first perform "Dreams of a Silent Shore"?

406    What inspired the lighting effects used in this performance?

400

410

402

704  Who is the Costume Director for the show?

706  What is the next song in the set?

708  What are the "surprises in store" mentioned by the host?

SYSTEMS AND METHODS FOR DYNAMIC INTERACTIVE USER CONTROL IN LIVE STREAMING WITH INTEGRATED ARTIFICIAL INTELLIGENCE

RELATED APPLICATION DATA

This application claims the benefit of U.S. Application No. 63/587,031, filed 29 Sep. 2023, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 1 illustrates a system for interactive user control in live streaming with integrated artificial intelligence.

FIG. 3 illustrates a method for interactive user control in live streaming with integrated artificial intelligence.

Figure 2:
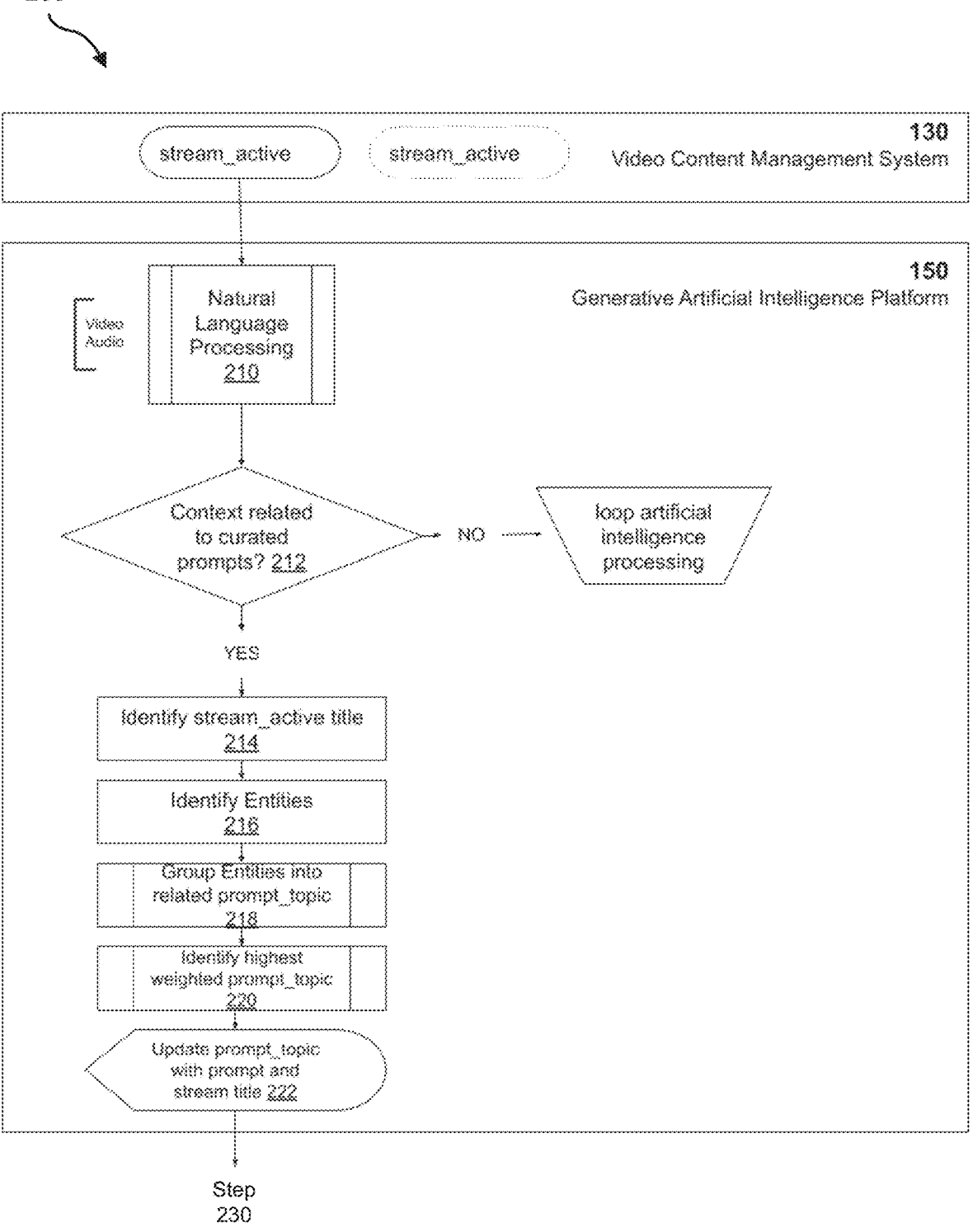
FIG. 2 illustrates a method for interactive user control in live streaming with integrated artificial intelligence.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Live video streaming has become a prevalent mode of content delivery for various types of events, ranging from music concerts and sports to news coverage and social gatherings. As technology advances, the quality of the video and audio streams has improved dramatically, offering users a high-quality view of the event. near-real-time experience that closely mimics being physically present at the event. However, the passive nature of remote viewing may lack elements to keep a user engaged and participating in the experience.

The present disclosure generally relates to providing engaging user experiences by identifying the content of and/or context of a live video stream and generating contextually relevant prompts for user interaction. Furthermore, the system may provide continued conversation with an artificial intelligence model based on the user-selected prompts and may dynamically update the set of available prompts according to real-time content changes and/or user interactions.

As used herein, the term "video stream" may refer to any transmission of digital video and/or audio data over a network. In some examples, playing a video stream may involve a continuous flow of data that is rendered approximately as it arrives rather than, e.g., an entire video file being delivered before playback. In some examples, a "live video stream" may refer to a video stream that has not been previously downloaded, processed, and/or analyzed by a computing system (and, thus, may be downloaded, processed, and/or analyzed "live" by the computing system). In some examples, a live video stream may refer to a video stream of a live event—e.g., where a video of an event is streamed and thereby viewed during the event (e.g., in real-time and/or near-real-time). As may be appreciated, a live video stream, while live, may be a near-real-time stream due to minor delays due to transmission time, broadcast delays (e.g., a broadcaster delaying transmission of an otherwise live feed in order to provide opportunities to enforce content controls, to make technical adjustments to ensure video quality, to synchronize audio and video feeds from differing sources, and/or to comply with regulatory requirements).

FIG. 1 illustrates an example system 100 for interactive user control in live streaming with integrated artificial intelligence. As shown in FIG. 1, system 100 may include a content management system 140. In some examples, content management system 140 may include one or more devices for capturing, storing, and/or distributing video stream data. For example, content management system 140 may include audio/visual equipment, storage systems, video encoding modules, and/or content distribution networks. In some examples, content management system 140 may format, organize, and/or distribute live video stream data for ultimate use by one or more end users.

In one example, content management system 140 may provide video stream data to a video content management system 130. Video content management system 130 may manage, distribute, and/or select one or more video streams (e.g., of an event) for ultimate use by one or more end users. In one example, video content management system 130 may provide video stream data to a generative artificial intelligence platform 150.

Generative artificial intelligence platform 150 may include any of a variety of subsystems. In some examples, platform 150 may include one or more artificial intelligence models that extract features from a video stream in real time. For example, these models may identify people, objects (e.g., a microphone, a trophy, a football, an animal), events (e.g., a singer singing a song, someone scoring a goal), places (e.g., a stage, a stadium), environmental factors (e.g., lighting, weather), text (e.g., banners, scoreboards), etc. In some examples, platform 150 may perform a multi-layered content identification by, e.g., using more than one type of artificial intelligence model for identifying various kinds of content (e.g., one for actions and another for emotional cues).

In some examples, platform 150 may include one or more artificial intelligence models that generate (e.g., in real-time) prompts based on content identified within the video stream. In some examples, these models may include a generative machine learning model that generates the prompts. Additionally or alternatively, these models may match the content to one of a list of pre-selected prompts (e.g., prompts relating to events expected to happen in the live video stream). In some examples, the prompts may be prompts to be used as input for a generative machine learning model (e.g., a question about the content identified within the video stream that elicits information from and/or initiates a conversation with a generative machine learning model when submitted to the model). In some examples, the models of platform 150 may generate one or more topics and/or textual characterizations of content identified within the video, and one or more additional generative machine learning models may generate one or more prompts based at least in part on the topics and/or textual characterizations of the content.

As used herein, the term "generative machine learning model" may generally refer to a model that generates new data that is similar to, but not identical to, the data it was trained on. A generative machine learning model may include any of a variety of components including, for example and without limitation, one or more generative adversarial networks, one or more variational autoencoders, one or more recurrent neural networks (including, e.g., one or more long short-term memory networks), and/or one or more transformers. In some examples, a generative machine learning model may be trained on natural language text and may produce natural language text. In some examples, the generative machine learning model may include a large language model.

As mentioned above, in some examples a generative machine learning model may generate and/or select a prompt based at least in part on the real-time identified content of the live video stream. In addition, in some examples, the prompt may be generated and/or selected based at least in part on a user's current and/or previous conversation with the generative machine learning model, information about a user's interaction with the live video stream (e.g., whether and when the user has had the live video stream selected and/or in focus, when the user started streaming the live video stream, and whether the user is currently navigated to the most recent portion of the live video stream or an earlier portion of the live video stream), and/or other contextual information (e.g., about the user, about the user's device, about the time of day, live data about other events, live input from an administrator of the live stream, etc.).

In some examples, platform 150 may provide the generated and/or selected prompts to a Video Player & Artificial Intelligence Interaction Layer 160. Layer 160 may present the live video stream to the user in conjunction with the prompts. In some examples, layer 160 may provide an interface for the user to select a prompt for use with a generative machine learning model and to display a response from the generative machine learning model. The interface may also allow the user to enter free-form text (e.g., to continue a conversation with the generative machine learning model). In some examples, layer 160 may periodically update the displayed prompts. For example, layer 160 may update the displayed prompts by determining that a prompt has expired. For example, layer 160 may remove and/or changing a prompt that has not been selected for a predetermined period of time and/or that has become less relevant based on identified content within the live video stream (e.g., a camera shot has changed, a location has changed, an event and/or person of focus has changed, etc.). Likewise, layer 160 may update the displayed prompts by adding a prompt that has become relevant based on the identified content of the current moment of the livestream. In some examples, layer 160 may display multiple prompt options at once. In some examples, layer 160 may display some prompts more prominently than others (e.g., based on ordering/position, visual highlighting, etc.). In these examples, layer 160 may determine the prominence of each prompt based on any suitable factors including, e.g., a determination of relevance based on the identified content, information about the user (including, e.g., the user's past interaction with the prompts and/or with the generative machine learning model), and/or information supplied regarding the relative importance of the prompts with a pre-selected list of prompts.

In some examples, layer 160 may provide a graphical user interface that includes the video stream, selectable interface items that allow a user to select a prompt, and/or a chat interface item that allows a user to chat with a generative machine learning model (and into which user-selected prompts are inserted).

In some examples, layer 160 may be in communication with one or more end-user clients 102(1)-(n). Clients 102 (1)-(n) may include any suitable system, platform, device, and/or software, including, without limitation, a mobile device (e.g., a smartphone, a tablet, a laptop), a desktop computing device, an augmented reality device, a virtual reality device, a set-top box, a streaming application, and/or a web browser.

FIG. 2 illustrates a flow 200 for interactive user control in live streaming with integrated artificial intelligence. For example, video content management system 130 may provide a video stream ("stream_active") to generative artificial intelligence platform 150. At a step 210, platform 150 may perform natural language processing to extract features from the video stream (e.g., based on video and/or audio of the video stream) as natural language text. At a step 212, platform 150 may determine whether the context of the video stream as indicated by the extracted features is related to any of a list of curated prompts. If not, platform 150 may continue to perform artificial intelligence processing to identify features within the video stream. If the context is related to one or more curated prompts, at a step 214, platform 150 may identify the title of the video stream. At a step 216, platform 150 may identify one or more entities related to a prompt topic. At a step 218, platform 150 may group the entities into the related prompt topic. At a step 220, platform 150 may identify the highest weighted prompt topic. At a step 222, platform 150 may then update a display of prompts to the user with the relevant prompt and the stream title. In some examples, flow 200 may then continue to a step 230.

FIG. 3 illustrates a flow 300 for interactive user control in live streaming with integrated artificial intelligence. As shown in FIG. 3, following processing by platform 150, at a step 230 systems described herein may determine whether the user has selected a prompt (e.g., by clicking on the prompt within an interface). If not, at a step 270 these systems may add the prompt to an interface element defining the prompt topic and, at a step 272, display the prompt and prompt topic until it is updated. At a step 274, systems described herein may examine the weight of the prompt and other prompts to determine whether the prompt topic is in the top 4 prompt topics. If so, these systems continue to display the prompt topic and prompt. If not, at a step 276, after a defined duration, the slot in the interface used for the prompt is updated with a new prompt topic (e.g., that is within the top 4 prompt topics by weighting). In some examples, at a step 280, systems described herein may display the current prompt until a defined duration has been met. Once the defined duration has been met, at a step 282 these systems may update a prompt slot in the interface with a defined prompt topic and then, at a step 284, may display the most recent prompt added to the defined prompt topic.

Returning to step 230, when the user does click the prompt, at a step 232 systems described herein may display a banner with click-through action text and the title of the video stream. In addition, at a step 234, these systems may display insight from an artificial intelligence model in a response window. These systems may then, at a step 236, add to another prompt topic.

In some examples, at a step 238, the user may send a response to the artificial intelligence model. Then, at a step 260, platform 150 may perform natural language processing. At a step 262, platform 150 may determine whether the context of the video stream is related to the user's response. If so, platform 150 may return to step 234 to display a further response. Otherwise, at a step 264, platform 150 may add to a prompt topic and may display a defined default response at a step 266.

Returning to step 238, when the user does not send a response to the artificial intelligence model, at a step 240 platform 150 may provide a three-second delay. Then, at a step 242, platform 150 may display a click-through action button. At a step 244, systems described herein may determine whether the user clicks the click-through action button. If not, at a step 246 platform 150 may maintain the insight from the artificial intelligence model in the response window. Then, at a step 248, platform 150 may update a prompt slot with a new prompt topic.

If, at step 244, the user does click the click-through action button, at a step 250 platform 150 may identify source content links. At a step 252, platform 150 may display the source content links as clickable thumbnails. At a step 254, systems may determine whether the user clicks the thumbnail. If so, at a step 256, these systems may open the link in an external window.

Figure 4:
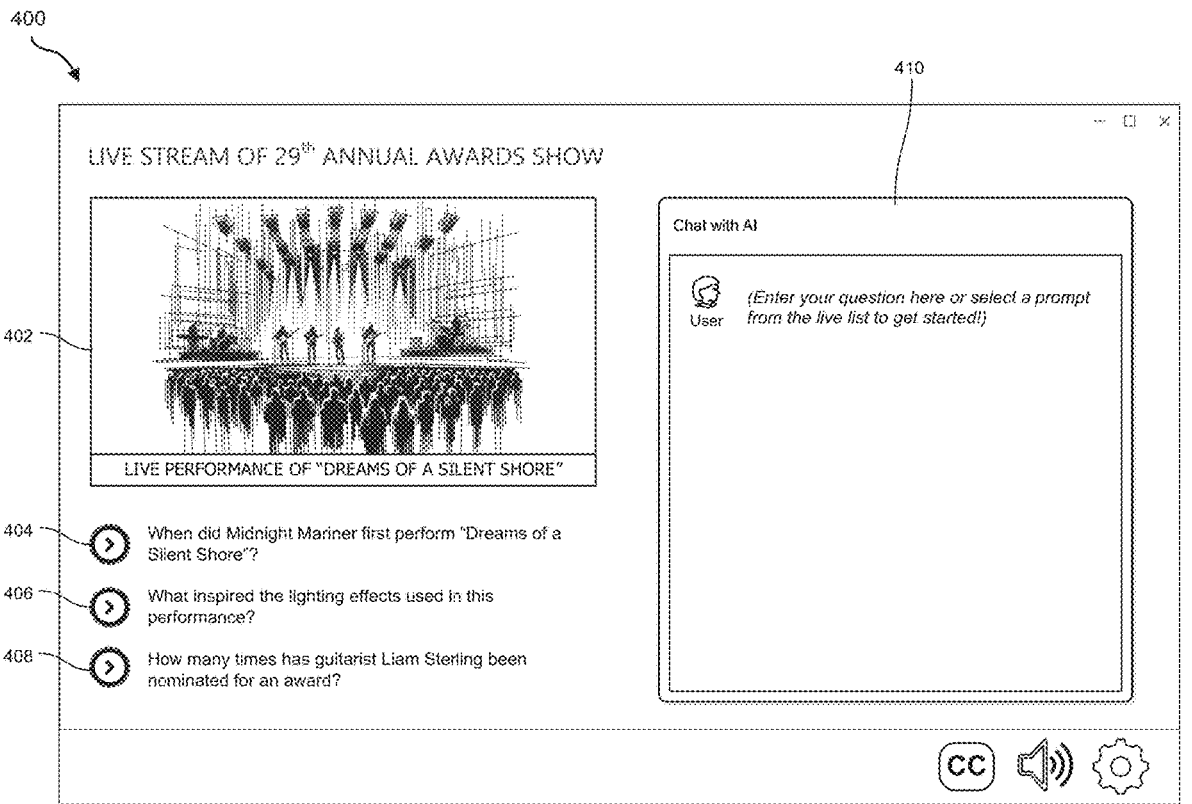
FIG. 4 illustrates an example interface for interactive user control in live streaming with integrated artificial intelligence.

FIG. 4 illustrates an example interface 400 for interactive user control in live streaming with integrated artificial intelligence. As shown in FIG. 4, interface 400 may include a live video stream 402 of an event. Interface 400 may also include suggested prompts 404, 406, and 408. Prompts 404, 406, and 408 may be presented as selectable elements. Interface 400 may additionally include a chat interface 410 that allows a user to chat with a generative machine learning model about the event as depicted by live video stream 402.

In one example, as depicted in FIG. 4, video stream 402 may show a performance of a song. One or more machine learning models may analyze the video to identify content within the video, including, e.g., identifying the performers (as a group and individually), the song being performed, and the setting of the performance. In some examples, these models may identify the content based at least in part on one or more segments of the video and/or segments of the audio of the video stream. In addition, in some examples, these models may identify the content based at least in part on accompanying metadata describing the event (e.g., information about the expected program, information about the expected attendees, information about the venue, scripts for the event, etc.) to more accurately recognize and describe the event. Nevertheless, these models may analyze the video stream in real time, thereby identifying content and relevant topics in the moment even without a script or if there are deviations from a provided script.

Because the machine learning models are analyzing video stream 402 in real-time, these models may provide relevant information for generating prompts 404, 406, and 408 that are relevant to the current content in the video stream. Thus, for example, suggested prompt 404 poses a question about the band and the song, suggested prompt 406 poses a question about the staging of the performing, and suggested prompt 408 poses a question about one of the performers that is contextually relevant in light of the event being portrayed. In some examples, one or more of the systems described herein may generate and/or select suggested prompts with a diversity criterion (i.e., prioritize generating and/or selecting prompts that differ from each other) in order to provide the user with varied options.

Figure 5:
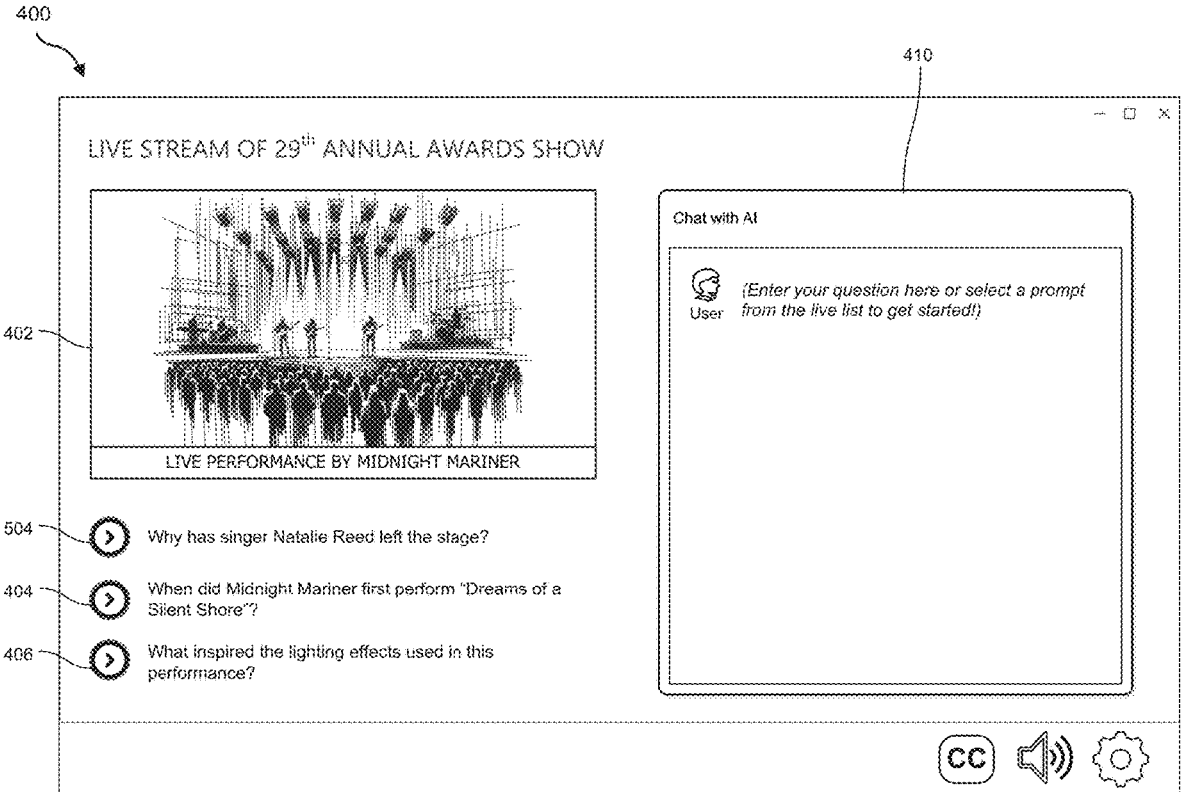
FIG. 5 illustrates the example interface of FIG. 4 in a subsequent state.

FIG. 5 illustrates the example interface 400 of FIG. 4 in a subsequent state. As shown in FIG. 5, suggested prompt 408 has been removed and suggested prompt 504 has been added to interface 400. The systems described herein may have made these changes to the list of prompts for any of a variety of reasons. For example, these systems may have detected from analyzing video stream 402 that one of the performers left the stage (identifying this event as recent and, therefore, potentially more relevant than suggested prompt 408). In some examples, these systems may additionally have processed accompanying information about the performer leaving the stage, thereby identifying it as a potential topic of interest and/or discussion. In some examples, these systems may have determined that suggested prompt 408 was displayed for a long period of time without being selected, and may have therefore replaced suggested prompt 408.

Figure 6:
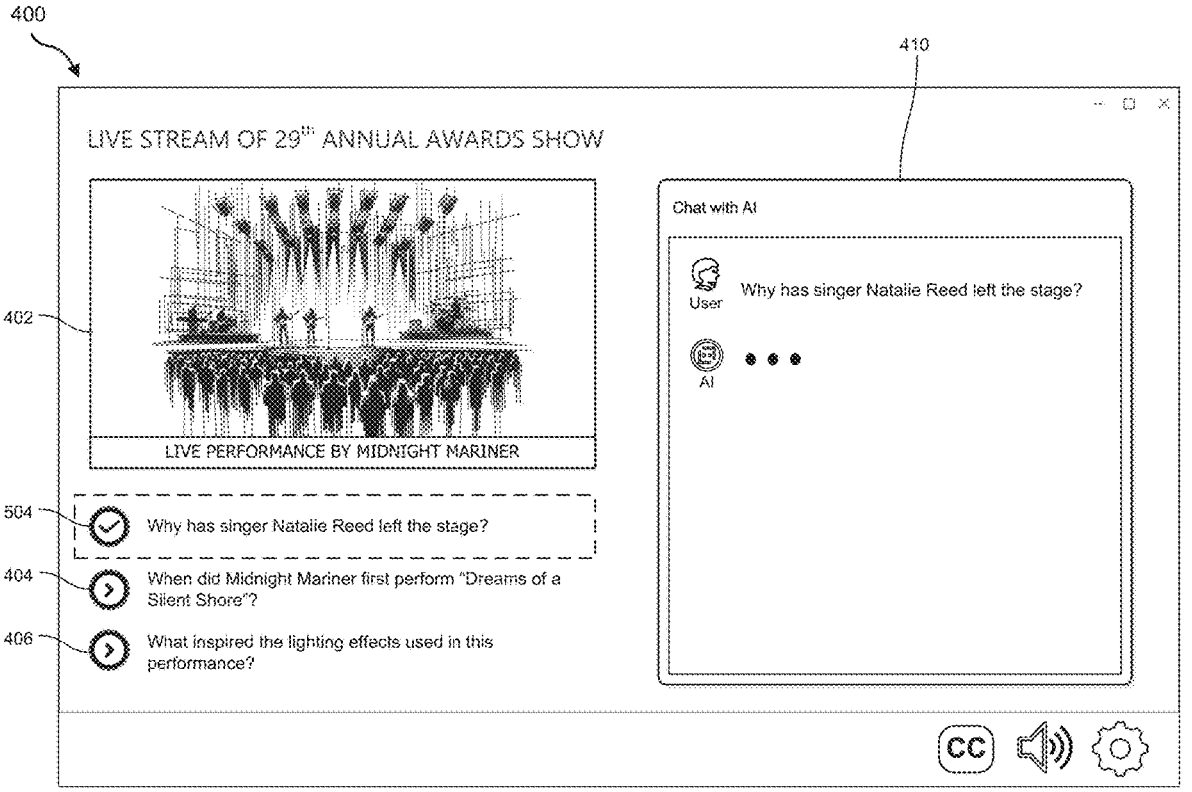
FIG. 6 illustrates the example interface of FIG. 4 in a subsequent state.

FIG. 6 illustrates the example interface 400 of FIG. 4 in a subsequent state. As shown in FIG. 6, a user may have selected suggested prompt 504 from the list of suggested prompts. By selecting suggested prompt 504, systems described herein may automatically populate chat interface 410 with suggested prompt 504 on behalf of the user.

Figure 7:
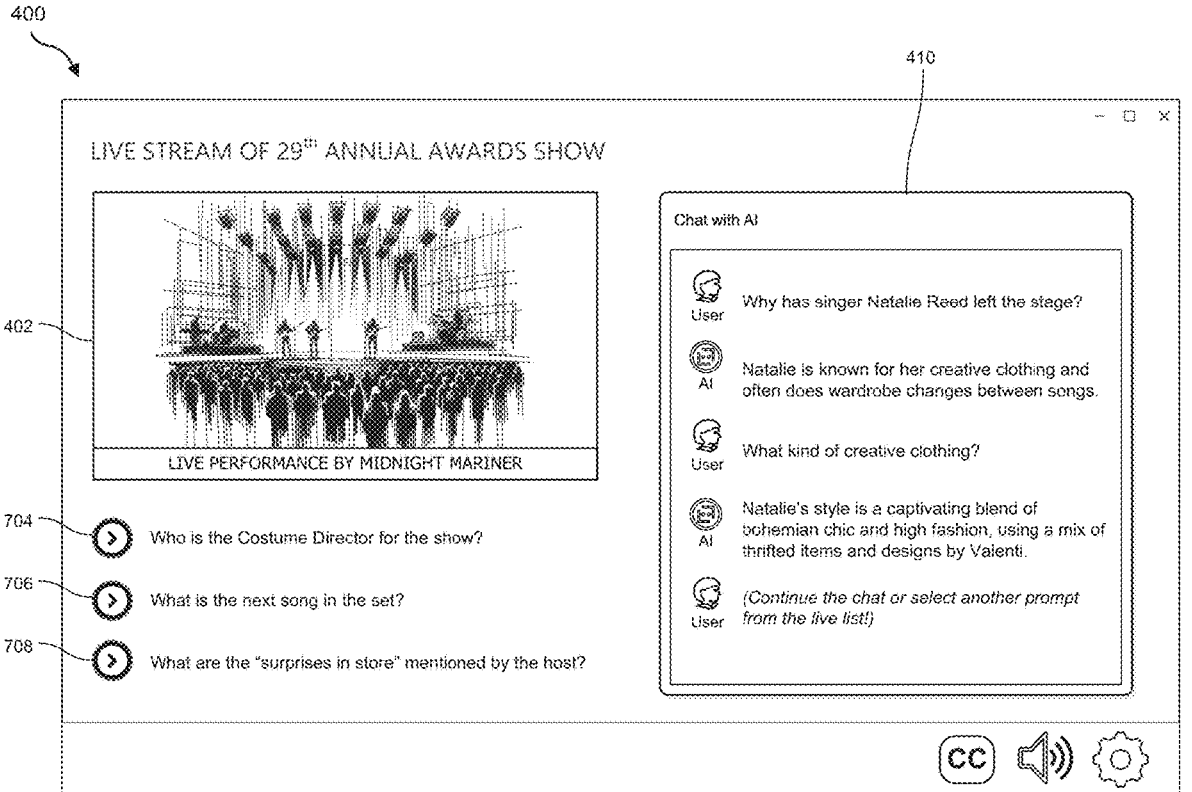
FIG. 7 illustrates the example interface of FIG. 4 in a subsequent state.

FIG. 7 illustrates the example interface 400 of FIG. 4 in a subsequent state. As shown in FIG. 7, the generative machine learning model may respond to the prompt selected by the user, and the user may continue the conversation with the generative machine learning model via the chat interface 410. The generative machine learning model may be configured to both continue the conversation using the context of the conversation (including the originally selected prompt) as well as, in some examples, continued context provided by analysis of the video stream and/or accompanying metadata about the video stream or the planned content of the video stream.

In addition, as shown in FIG. 7, new prompts 704, 706, and 708 may have replaced the previous prompts. Systems described herein may provide suggested prompt 704 at least in part on the topic of the prompt being relevant to the conversation in chat interface 410 (providing the user with opportunities to explore the topic further) in the broader context of video stream 402. In addition, in some examples these systems may provide suggested prompt 704 based at least in part on the user affirmatively showing further interest in the topic via chat interface 410 (e.g., by asking about clothing). Likewise, systems described herein may provide suggested prompt 706 based at least in part on the context of video stream 402 (including, e.g., information from analyzing the video stream that the previous song has ended and/or information from a program about the event supplied to the systems described herein indicating what would come next) and, in some examples, based in part on the prompt being relevant to the topic discussed (about wardrobe changes between songs). Similarly, systems described herein may provide suggested prompt 708 based on recent audio from video stream 402.

Figure 8:
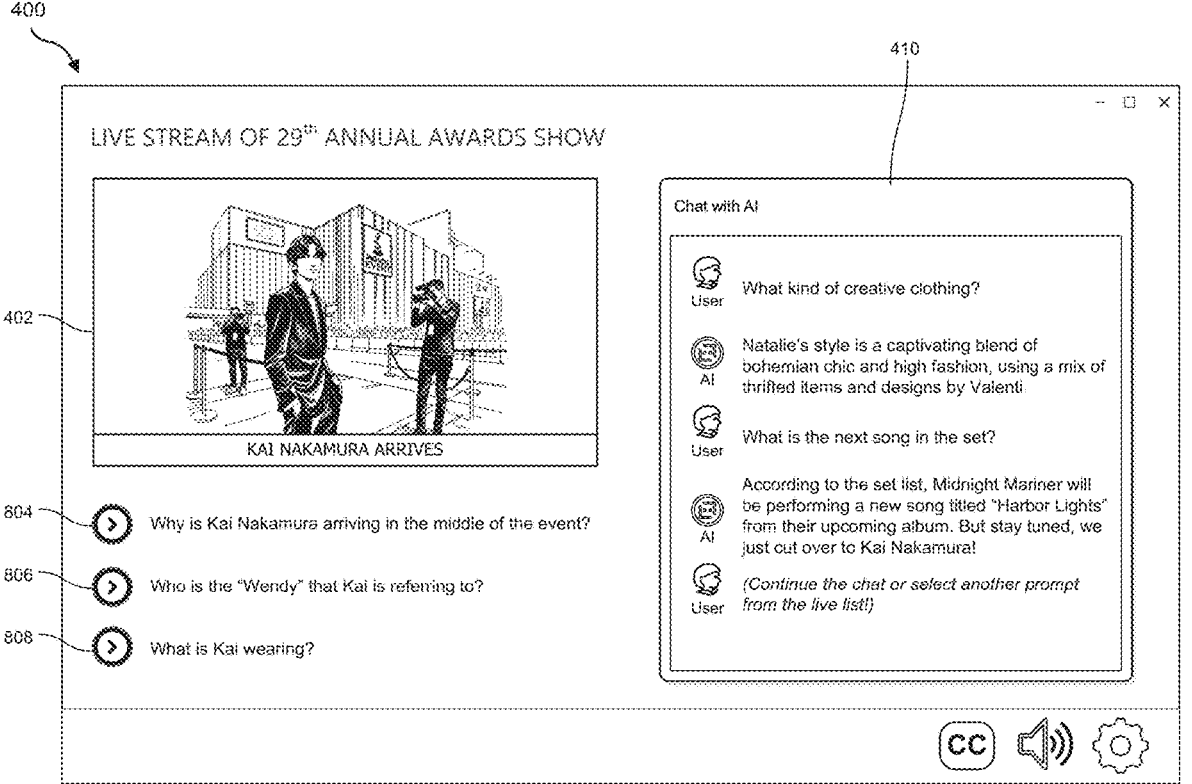
FIG. 8 illustrates the example interface of FIG. 4 in a subsequent state.

FIG. 8 illustrates the example interface 400 of FIG. 4 in a subsequent state. As shown in FIG. 8, the user may have selected an additional suggested prompt (prompt 706) to continue the conversation in chat interface 410. In addition, a change of scene in the video stream 402 may contribute to the systems described herein providing new suggested prompts 804, 806, 808 relating to the content of the new scene. In addition, the content of the new scene may be incorporated into the response of the generative machine learning model (e.g., before the user brings up the content).

In one example, a computer-implemented method may include identifying a video stream for presentation to a user; extracting, from content of a segment of the video stream, at least one topic; presenting, to the user, the at least one topic as a selectable interface item in a graphical user interface when the segment of the video stream is presented to the user; receiving an input from the user selecting the at least one topic via the selectable interface item; and providing, in response to receiving the input from the user, the at least one topic as a prompt to a generative machine learning model.

In one example, the graphical user interface may include a chat interface between the user and the generative machine learning model.

In one example, the computer-implemented method may also include extracting, from content of at least one additional segment of the video stream, a textual characterization of the additional segment. The generative machine learning model may receive the textual characterization as additional context for a chat with the user.

In one example, presenting, to the user, the topic as the selectable interface item may be a part of presenting a plurality of topics as separately selectable interface items to the user.

In one example, the computer-implemented method may also include presenting, to the user, an additional selectable topic extracted from content within the video stream; determining that the additional topic has expired; and replacing the additional selectable topic with an alternative selectable topic.

In one example, determining that the additional selectable topic has expired may include (1) determining that a predetermined amount of time has passed since presenting the additional selectable topic and/or (2) determining that a relevance of the additional selectable topic has fallen below a predetermined threshold based at least in part on a current content of the video stream.

In one example, determining that the additional selectable topic has expired is based at least in part on determining that a relevance of the alternative selectable topic exceeds the relevance of the additional selectable topic.

In one example, determining that the relevance of the alternative selectable topic exceeds the relevance of the additional selectable topic may be based at least in part on user input to a chat interface between the user and the generative machine learning model indicating user interest in the alternative selectable topic.

In one example, the computer-implemented method may further include presenting the video stream to the user in the graphical user interface.

In one example, extracting, from the content of the segment of the video stream, the topic may include providing the segment of the video stream as input to a machine learning model that provides textual descriptions of video stream content as output.

In one example, the computer-implemented method may further include (1) extracting an additional topic from an additional segment of the video stream, (2) identifying a predefined prompt associated with the video stream, (3) determining that the additional topic matches the predefined prompt, and (4) presenting, to the user, the predefined prompt as a selectable interface item based at least in part on the additional topic matching the predefined prompt.

In one example, the video stream may include a live video stream.

As detailed above, the computing devices and systems described and/or illustrated herein broadly represent any type or form of computing device or system capable of executing computer-executable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media (e.g., non-transitory computer-readable media), such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A computer-implemented method comprising:
identifying a video stream for presentation to a user;
extracting a plurality of features from content of a segment of the video stream;
determining, in response to extracting the plurality of features, at least one topic based on the plurality of features;
presenting, to the user in response to determining the at least one topic, the at least one topic as a selectable interface item in a graphical user interface when the segment of the video stream is presented to the user;
receiving an input from the user selecting the at least one topic via the selectable interface item;
providing, in response to receiving the input from the user, the at least one topic as a prompt to a generative machine learning model;
presenting, to the user, an additional selectable topic extracted from content within the video stream;
determining that the additional selectable topic has expired; and
replacing the additional selectable topic with an alternative selectable topic.

2. The computer-implemented method of claim 1, wherein the graphical user interface comprises a chat interface between the user and the generative machine learning model.

3. The computer-implemented method of claim 1, further comprising extracting, from content of at least one additional segment of the video stream, a textual characterization of the at least one additional segment;
wherein the generative machine learning model receives the textual characterization as additional context for a chat with the user.

4. The computer-implemented method of claim 1, wherein presenting, to the user, the at least one topic as the selectable interface item comprises presenting, to the user, a plurality of topics as separately selectable interface items.

5. The computer-implemented method of claim 1, wherein determining that the additional selectable topic has expired comprises at least one of:
determining that a predetermined amount of time has passed since presenting the additional selectable topic; or
determining that a relevance of the additional selectable topic has fallen below a predetermined threshold based at least in part on a current content of the video stream.

6. The computer-implemented method of claim 1, wherein determining that the additional selectable topic has expired is based at least in part on determining that a relevance of the alternative selectable topic exceeds the relevance of the additional selectable topic.

7. The computer-implemented method of claim 6, wherein determining that the relevance of the alternative selectable topic exceeds the relevance of the additional selectable topic is based at least in part on user input to a chat interface between the user and the generative machine learning model indicating user interest in the alternative selectable topic.

8. The computer-implemented method of claim 1, further comprising presenting the video stream to the user in the graphical user interface.

9. The computer-implemented method of claim 1, wherein extracting, from the content of the segment of the video stream, the at least one topic comprises providing the segment of the video stream as input to a machine learning model that provides textual descriptions of video stream content as output.

10. The computer-implemented method of claim 1, further comprising:
extracting an additional topic from an additional segment of the video stream;
identifying a predefined prompt associated with the video stream;
determining that the additional topic matches the predefined prompt; and
presenting, to the user, the predefined prompt as a selectable interface item based at least in part on the additional topic matching the predefined prompt.

11. The computer-implemented method of claim 1, wherein the video stream comprises a live video stream.

12. A system comprising:
at least one physical processor; and
at least one physical memory comprising computer-executable instructions that, when executed by the at least one physical processor, cause the at least one physical processor to:
identify a video stream for presentation to a user;
extract a plurality of features from content of a segment of the video stream;
determine, in response to extracting the plurality of features, at least one topic based on the plurality of features;

present, to the user in response to determining the at least one topic, the at least one topic as a selectable interface item in a graphical user interface when the segment of the video stream is presented to the user;

receiving an input from the user selecting the at least one topic via the selectable interface item;

provide, in response to receiving the input from the user, the at least one topic as a prompt to a generative machine learning model;

present, to the user, an additional selectable topic extracted from content within the video stream;

determine that the additional selectable topic has expired; and replace the additional selectable topic with an alternative selectable topic.

13. The system of claim 12, wherein the graphical user interface comprises a chat interface between the user and the generative machine learning model.

14. The system of claim 12, wherein the computer-executable instructions further cause the at least one physical processor to extract, from content of at least one additional segment of the video stream, a textual characterization of the at least one additional segment;

wherein the generative machine learning model receives the textual characterization as additional context for a chat with the user.

15. The system of claim 12, wherein presenting, to the user, the at least one topic as the selectable interface item comprises presenting, to the user, a plurality of topics as separately selectable interface items.

16. The system of claim 12, wherein determining that the additional selectable topic has expired comprises at least one of:

determining that a predetermined amount of time has passed since presenting the additional selectable topic; or determining that a relevance of the additional selectable topic has fallen below a predetermined threshold based at least in part on a current content of the video stream.

17. The system of claim 12, wherein determining that the additional selectable topic has expired is based at least in part on determining that a relevance of the alternative selectable topic exceeds the relevance of the additional selectable topic.

18. At least one non-transitory computer-readable medium comprising one or more computer-executable instructions that, when executed by at least one processor of a computing device, cause the computing device to:

identify a video stream for presentation to a user;

extract a plurality of features from content of a segment of the video stream;

determine, in response to extracting the plurality of features, at least one topic based on the plurality of features;

present, to the user in response to determining the at least one topic, the at least one topic as a selectable interface item in a graphical user interface when the segment of the video stream is presented to the user;

receive an input from the user selecting the at least one topic via the selectable interface item;

provide, in response to receiving the input from the user, the at least one topic as a prompt to a generative machine learning model;

present, to the user, an additional selectable topic extracted from content within the video stream;

determine that the additional selectable topic has expired; and replace the additional selectable topic with an alternative selectable topic.

* * * * *